May 13, 1958  J. L. PATTON ET AL.  2,834,823
ISOMERIZATION OF HYDROCARBONS
Filed March 7, 1955
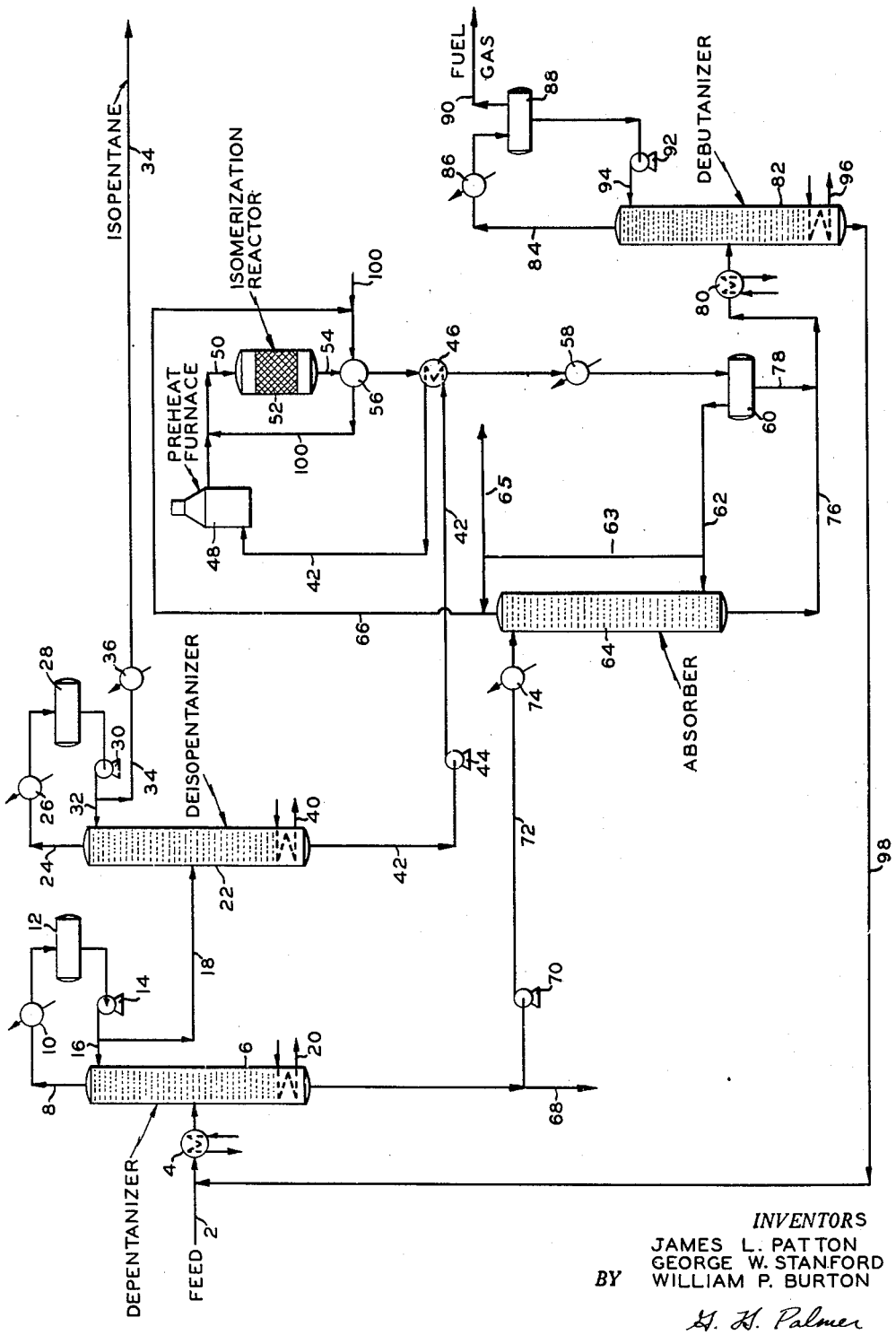
INVENTORS
JAMES L. PATTON
GEORGE W. STANFORD
BY WILLIAM P. BURTON
*G. H. Palmer*
ATTORNEYS United States Patent Office 2,834,823
Patented May 13, 1958

2,834,823

ISOMERIZATION OF HYDROCARBONS

James L. Patton, Ramsey, George W. Stanford, Linden, and William P. Burton, Little Silver, N. J., assignors to The M. W. Kellogg Company, Jersey City, N. J., a corporation of Delaware Application March 7, 1955, Serial No. 492,537

6 Claims. (Cl. 260—683.65)

This invention relates to a process for the isomerization of hydrocarbons. More particularly it relates to a process for the isomerization of hydrocarbons in the presence of hydrogen and a solid isomerization catalyst.

The catalytic isomerization of hydrocarbons, and in particular normal paraffin hydrocarbons, is widely employed in the petroleum and chemical industries. In the past it has been the general practice to utilize Friedel-Crafts catalysts, that is metallic halides to promote isomerization reactions. These catalysts have been used either singly or in mixtures and also in conjunction with promoters such as halogen acids or various hydrocarbons. Typical examples of previously used catalysts are aluminum chloride, aluminum bromide, hydrofluoric acid plus boron fluoride, aluminum chloride plus hydrochloric acid, aluminum chloride-hydrocarbon complex, etc. Although satisfactory in some respects it has been found that isomerization processes wherein these catalysts are used suffer from several disadvantages, including extensive equipment corrosion, high catalyst consumption due to loss of catalyst activity and difficult and expensive product and catalyst recovery problems. These deficiencies exist to a high degree in both liquid and vapor isomerization processes but are of a particularly serious nature in liquid processes. It is with the solution of these problems of the present isomerization processes that the invention disclosed herein is concerned.

It is an object of this invention to provide an improved process for the catalytic isomerization of hydrocarbons in the vapor state in the presence of hydrogen.

Another object of this invention is to provide an improved process for the catalytic conversion in the presence of hydrogen of hydrocarbons in the vapor state to hydrocarbons having a higher octane rating, more specifically the conversion of low octane paraffin hydrocarbons to high octane isoparaffin hydrocarbons.

Still another object of this invention is to provide an isomerization process in which equipment corrosion and catalyst deterioration is minimized.

These and other objects of this invention will become more apparent from the following detailed description and discussion.

In accomplishing the objects of this invention, a hydrocarbon feed material is converted in a reaction zone at an elevated temperature in the presence of hydrogen and a solid isomerization catalyst. Effluent from the reaction zone is separated into several fractions, including a hydrogen rich gas, product isomer, unreacted hydrocarbon and side products boiling both below and above the isomer. In one aspect of the invention the hydrogen-rich gas is contacted with a stream of high boiling reaction side products to effect removal of light hydrocarbons therefrom and is recycled to the reaction zone. Unconverted hydrocarbon is combined with fresh feed, also for recycle to the reaction zone.

In general, compounds suitable for isomerization include low normal boiling paraffin hydrocarbons such as normal butane, normal pentane, normal hexane, etc., alkyl aliphatic cyclic hydrocarbons such as butyl cyclo-pentane, butyl cyclo-hexane, pentyl cyclo-hexane, etc., aliphatic cyclic hydrocarbons such as cyclo-pentane, cyclo-hexane, cyclo-heptane, etc., olefinic hydrocarbons such as butylenes, pentylenes, hexylenes, etc., alkyl aromatic hydrocarbons such as butyl benzene, pentyl naphthalene, etc., and alkyl heterocyclic compounds such as pyridine, thiopene, pyrrole, furan, etc. All of the above classes of compounds except the aliphatic cyclic hydrocarbons contain a straight chain aliphatic group. Preferably this chain comprises an alkyl group although one or more of the hydrogen atoms of the alkyl group may be substituted with other radicals such as cyclo-alkyl radicals, alkoxy radicals, halogen radicals, etc.

It should be understood that the degree of conversion will vary with the reaction conditions and the catalyst employed. Thus, although the conversion of the general class of compounds containing an aliphatic chain to isomers thereof is contemplated in carrying out the process of this invention, it has been found that particularly excellent results are obtained when utilizing a normal paraffin hydrocarbon feed. Typical isomerization reactions with normal paraffins as starting materials include the isomerization of normal butane to isobutane, a valuable starting material in the preparation of aviation gasoline alkylate and isomerization of normal pentane and normal hexane to isopentane and isohexane, high octane compounds suitable for blending in motor fuel. In these and in similar isomerization reactions utilizing as feed materials higher boiling normal paraffin hydrocarbons and hydrocarbons selected from the aforementioned general class, quantities of side products boiling both below and above the product isomers are usually formed. The amounts and types of such compounds formed are subject to variation, depending on the type of reactants, reaction conditions, and the particular isomerization catalyst used.

A valuable source of isomerization feed materials lies in refinery process streams, which are usually rich in normal paraffins, particularly the lower boiling of these compounds. Typical examples of refinery fractions from which normal paraffins are readily obtained are straight-run napththas, straight-run and cracked gasolines and gases from crude and cracking units. In preparing an isomerization feed material, fractions such as these may be processed to concentrate the normal paraffins therein or they may be processed to effect the removal of substantially pure normal paraffins or normal paraffin mixtures. It is preferred because of equilibrium and rate considerations to use a feed stock containing substantially all normal paraffins and still more preferably a single normal paraffin.

The isomerization of low boiling straight-chain paraffins is preferably carried out at a temperature between about 750° F. and about 850° F. Temperatures as low as 600° F. and as high as 950° F. may be used, however, the reaction rate is quite low at the lower temperature and at temperatures above 850° F. undesirable side reactions accompanied by carbon deposition take place. To initiate the reaction and provide a vaporized feed the reactants are preheated, preferably to about the reaction zone temperature. The reaction pressure may be varied over a wide range, however, more usually a pressure of between about 150 p. s. i. g. and about 500 p. s. i. g. is maintained in the reaction zone. It is generally desirable to operate at a space velocity between about 0.5 and about 10 pounds of hydrocarbon per hour per pound of catalyst. Operation in the lower portion of this range is preferred inasmuch as the degree of conversion decreases with increasing space velocity. The hydrogen to hydrocarbon ratio is preferably maintained between about 0.5 and about 3 mols per mol. The isomerization conversion rate is inversely proportional to the hydrogen to hydrocarbon ratio and for this reason it is preferred to maintain the hydrogen concentration at a minimum. There does not appear to be any upper limit to the hydrogen to hydrocarbon ratio which may be used, however, extended operation at ratios below about 0.7 lowers the activity of the catalyst substantially. Also operation over lengthy periods at temperatures above about 850° F. causes catalyst contamination from carbonaceous materials due to cracking. By controlling the operating conditions within the general ranges given it is possible to isomerize for extended periods of time without regenerating or replacing the catalyst.

Although small in extent some cracking does take place along with the isomerization reaction. Because of this, it is necessary to add small amounts of hydrogen to the reaction in order to maintain a constant hydrogen concentration. More usually the amount of make-up hydrogen required varies between about 20 and about 100 standard cubic feet per barrel of normal paraffin feed.

Reaction conditions when isomerizing hydrocarbons other than normal paraffins will vary according to the particular hydrocarbon. In general, however, the preferred ranges of temperature, pressure, space velocity, hydrogen concentration and hydrogen consumption are similar to those used with normal paraffins.

Catalysts used for isomerization within the scope of this invention are principally the conventional reforming catalysts, that is catalysts which are normally utilized in the conversion of low octane naphthas and gasoline in the presence of hydrogen to higher octane materials by the process of reforming. The reforming process broadly includes a number of hydrocarbon reactions, for example, hydrocracking, aromatization, cracking, isomerization, cyclization, dehydrogenation, hydrogenation, etc. It has been found that when these catalysts are used with feed materials chosen from those previously mentioned, they are selective in their action and are effective in promoting isomerization in the presence of hydrogen to the substantial exclusion of other reforming reactions.

Catalysts used for reforming become contaminated with carbonaceous materials after prolonged use and require regeneration to renew their activity. Unfortunately, the regeneration process does not provide a catalyst having an activity equal to the original uncontaminated catalyst and the catalyst becomes permanently partially deactivated. Such catalysts although no longer fully effective for reforming are nevertheless very effective in promoting the isomerization reaction. Therefore, it is within the scope of this invention to isomerize with fresh catalysts or with catalysts previously used in reforming or with mixtures thereof. In its broad aspect the invention is not restricted, however, to isomerization catalysts which are also useful for reforming but is intended to embrace the use of other solid catalysts which promote isomerization of hydrocarbons in the presence of hydrogen.

One group of catalysts used in the isomerization operation comprises platinum or palladium composited with a cracking component. The percentage of the metal in the catalyst usually is between about 0.01 and about 10 percent by weight and more preferably, between about 0.05 and about 1.5 percent. The cracking component comprises any suitable cracking catalyst either natural or synthetic including acid treated clays and synthetic catalyst such as silica, alumina, silica-alumina, silica-zirconia, silica-magnesia, silica-thoria, silica-vanadia, silica-alumina-zirconia, silica-alumina-magnesia, etc. Another group of catalysts also useful in promoting the reforming reactions are those listed above and containing a combined halogen, for example, fluorine or chlorine, in a quantity between about 0.1 and about 8 percent by weight. Still another group of catalysts comprises the oxides or sulfides of elements of Group VI–B, for example chromium, molybdenum or tungsten, supported preferably on alumina but also on magnesia, natural clays, crushed firebrick, crushed silica, etc. In general the chromium, molybdenum or tungsten comprises only a small portion of the total catalyst mass, more usually between about 1 and about 10 weight percent. Yet another group of catalysts comprises heteropoly acids having at least one central acid group selected from the oxides or sulfides of elements of groups V–A and VI–A and outer acid groups in the ratio of about 3–12 to 1 selected from the oxides of elements of groups V–B and VI–B, for example, molybdenum acid iodate, phosphomolybdic acid, silico tungstic acid, etc. These and other conventional solid reforming catalysts are used within the scope of this invention.

The above catalysts may be prepared by any of the conventional methods well-known in the art. For example, platinum-silica-alumina catalyst is prepared in one instance by mixing dry silica-alumina gel with a platinum salt and calcining at an elevated temperature. If a halogen substituted catalyst is desired, the halogen, usually in the form of an acid, may be added to the silica-alumina gel and platinum salt prior to calcining. When chromia-alumina catalyst is desired, it is prepared by one method, by depositing chromium nitrate on alumina by evaporation with subsequent igniting to form the oxide, etc.

As mentioned previously, the factors of reaction equilibrium and reaction rate are important in determining the selection of isomerization feed materials. For example, the isomerization of a normal paraffin to an isoparaffin is controlled not only by temperature, pressure, weight space velocity, etc., but also by the composition of the reactants; a typical example is the isomerization of normal pentane to isopentane. When isomerizing normal pentane at a temperature of about 800° F., a pressure of about 300 p. s. i. g. and a weight space velocity of about 4 pounds of hydrocarbon per hour per pound of catalyst in the presence of a platinum catalyst, the equilibrium ratio of isopentane to normal pentane in the reaction product is about 2 mols per mol. Thus, every 100 mols of reaction product contains a maximum of 66.6 mols of isopentane. This condition prevails immaterial of the composition of the feed material prior to the isomerization reaction. If the reactants are proportioned in a ratio of 2 mols of isopentane to 1 mol of normal pentane then under the conditions cited above no further conversion occurs. If, on the other hand, the reactant ratio is less than this, isopentane is formed up to the maximum set by the equilibrium ratio and if the ratio of isopentane to normal pentane in the reactants is greater than 2:1, the amount of isopentane is the reaction product decreases under the aforementioned reaction conditions to a ratio of about 2:1.

Normal paraffins of different molecular weight require different optimum conditions, thus when isomerizing mixtures of normal paraffins, the reactant composition also affects the degree of conversion and the product distribution. For example, in a mixture of normal paraffins A, B and C, conditions chosen for conversion of normal paraffin A may result in a low yield of isomer from normal paraffin B or normal paraffin C or vice versa. It is apparent from the preceding that while it is within the scope of the invention to isomerize a feed comprising hydrocarbons and their isomers in varying proportions, it is preferred to isomerize hydrocarbons free of isomers and still more preferably a single hydrocarbon.

In order to provide a clear picture of the beneficial results of isomerizing hydrocarbons by the method of this invention, a single compound, normal pentane has been selected as a feed material for detailed discussion and illustration of the invention. In carrying out the isomerization process, pentane is preheated to substantially reaction zone temperature, combined with hydrogen and passed into a reaction zone containing an isomerization catalyst. The catalytic reaction may take place in a conventional fluid bed of the moving or fixed type or it may be carried out in a conventional non-fluid bed, also either fixed or moving. When chromium, molybdenum or tungsten catalysts or heteropoly acids are used the former type of bed is preferred. On the other hand, when platinum or palladium catalysts are used, a non-fluid bed, usually of the fixed type is preferred in order to minimize attrition loses of these highly expensive catalysts. In a non-fluid fixed bed operation the catalyst is disposed in one or more beds arranged serially and/or in parallel, the catalysts being either in the form of lumps, granules, powder, etc., or in the form of pellets or other molded shapes. If the fluid type of bed is utilized it is provided in a conventional manner by passing a gasiform medium through a finely divided catalyst at a sufficient velocity to maintain a highly turbulent dense phase bed.

Within the reaction zone, pentane is converted to a mixture of isopentane and lower and higher boiling side products. The effluent from the reaction zone is condensed and cooled and a gaseous stream rich in hydrogen and containing low boiling gaseous hydrocarbons is separated therefrom. This uncondensed material is passed in contact with a lean oil which may be pentane feed or heavier compounds from the reaction zone effluent whereby the hydrocarbon constituents are absorbed from the gas. The stripped hydrogen gas is then recycled to the reaction zone and the lean oil is combined with the liquid portion of the reaction zone effluent. This combined liquid stream is passed to a separation zone and is fractionated to remove two hydrocarbon mixtures, one containing compounds lower boiling than the isomer and unconverted normal paraffin and the other containing compounds boiling at a higher temperature than the isomer and unconverted normal paraffin. The remaining liquid yield comprising isopentane and unconverted normal pentane is fractionated to remove the isomer product and the normal pentane is recycled to the reaction zone. The isomer being of high octane rating may be blended in gasoline or it may be used as a reactant in an alkylation process. Inasmuch as there is only a small consumption of hydrogen in the process, the unit is almost self-sustaining in this respect and after the process is under way very little outside hydrogen is required other than that necessary to replace losses through handling.

The method of this invention provides a process essentially free from the disadvantages of previous process. By conducting the isomerization reaction in the vapor state, the problem of product and catalyst separation encountered in liquid phase processes is substantially eliminated. Even when a fluid rather than a non-fluid process is used there is no substantial separation problem since conventional separation means normally employed in other fluid processes can be used. In the proposed operation there is no tendency for catalyst migration within or out of the catalyst bed as is often encountered when using Friedel-Crafts catalysts. Since no promoters are required in the proposed process and the catalysts used do not contain corrosive materials the problem of equipment corrosion is non-existent. Also the catalysts proposed for use herein have relatively long lives and are easily regenerated if the necessity arises. It is contemplated, however, that there will be little or no deposition of carbonaceous material when operating within the conditions and with the feed materials previously mentioned. This, combined with the fact that used reforming catalysts may be employed in the process provides an operation in which catalyst cost and catalyst consumption are held to a minimum.

In order to more clearly describe the invention and provide a better understanding thereof, reference is had to the accompanying drawing which is a diagrammatic illustration exemplifying a specific embodiment of the invention. Referring to the drawing, a hydrocarbon oil containing normal pentane and heavier hydrocarbons passes through conduit 2 in a steam preheater 4 and is introduced into a depentanizer tower 6. Prior to entering the steam preheater this material is joined through conduit 98 by a stream containing normal pentane, isopentane and heavier hydrocarbons obtained from a later stage of the isomerization process. In the depentanizer, normal and isopentane are taken overhead through conduit 8 and through a conventional water condenser 10 into a reflux accumulator 12. The condensed material passes through pump 14 and a portion is returned to the tower through conduit 16 as reflux. The remainder of the depentanizer overhead flows through conduit 18 into a deisopentanizer 22. The heat required for the separation in tower 6 is supplied by a conventional reboiler 20. The tower bottoms comprising a mixture of compounds boiling above normal pentane are divided into two streams with one stream being passed from the unit through conduit 68 and the remainder being transferred by pump 70 through conduit 72 and through a conventional water cooler 74 into an absorber 64.

The stream entering the deisopentanizer is split into 2 portions with lower boiling isopentane passing overhead through conduit 24 and higher boiling normal pentane being removed from the bottom of the tower through conduit 42. The overhead material is condensed in a conventional condenser 26 and passes into an accumulator 28. A portion of the liquid isopentane is refluxed to the tower through pump 30 and conduit 32 and the remainder passes through water cooler 36 and exits from the unit through conduit 34. The heat requirements of this tower are also supplied by a conventional reboiler 40. The tower bottoms pass through pump 44 and thence through heat exchanger 46 where heat is picked up by indirect heat exchange with effluent from the isomerization reactor. The warmer material then flows through preheat furnace 48 where it is vaporized and heated to a temperature of about 800° F. After leaving the preheater the normal pentane is combined with hydrogen introduced from conduit 100 in an amount sufficient to provide a hydrogen to hydrocarbon ratio of about 1.0 mol per mol and the mixture passes through conduit 50 into the isomerization reactor 52.

Within the reactor 52 there is maintained a bed of granular catalyst material comprising about 0.6% weight percent platinum on alumina previously used and regenerated several times as a reforming catalyst. The reactor is maintained at a pressure of about 300 p. s. i. g. and the flow rate therethrough is controlled to provide a space velocity of about 2 pounds of hydrocarbon per hour per pound of catalyst.

Gaseous effluent from the isomerization reactor comprising a mixture of hydrogen, isopentane, normal pentane and lower and higher boiling hydrocarbons passes from conduit 54 where heat is given off to incoming hydrogen, through heat exchanger 46 where the normal pentane feed is preheated and through a conventional water condenser 58 where still further heat is removed before this material enters an accumulator 60. Sufficient heat exchange surface is provided to condense the major portion of the hydrocarbons in the reactor effluent. Uncondensed hydrogen and light hydrocarbons are vented through conduit 62 to absorber 64 where they are contacted with a lean oil obtained from the depentanizer 6 as previously described. In its passage throught the absorber there is dissolved in the lean oil a major portion of the hydrocarbon vapors present in the hydrogen stream. The stripped hydrogen-rich gas passes overhead from the absorber through conduit 66 and is recycled to the isomerization reactor through conduit 100. To replace the hydrogen consumed by cracking reactions a small stream of hydrogen makeup, about 20 standard cubic feet per barrel of normal pentane feed is introduced to the circulating hydrogen-rich stream through conduit 100. Circulation of hydrogen-rich gas through the aforedescribed system is maintained by means of a conventional gas compressor (not shown).

Enriched lean oil from the bottom of the absorber passes through conduit 76, is combined with liquid reactor effluent from accumulator 60 through conduit 78 and the combined stream passes through a stream preheater 80 into a debutanizer tower 82. Although it is preferred to use the hydrocarbon oil specified, it is within the scope of the invention to use other streams for lean oil in the absorber 64, for example, fresh feed from conduit 2.

Conditions are maintained within the debutanizer to provide for the removal of lower boiling compounds overhead from the tower. These lower boiling materials pass through conduit 84, water condenser 86 and into accumulator 88. A quantity of gaseous materials containing butane and lighter hydrocarbons is withdrawn from the accumulator through conduit 90 and is yielded as fuel gas. Top tower temperature control is provided by returning the total liquid from the accumulator through pump 92 and conduit 94 to the top of the tower. A conventional reboiler 96 supplies the heat requirements for the separation in this tower. Bottoms from the debutanizer comprising isopentane, unconverted normal pentane and heavier hydrocarbons are combined with the feed material entering preheater 4 through conduit 98 as previously described.

A regeneration zone is not shown in the aforementioned process. Such a step may be provided, however, it is not anticipated that regeneration of the catalyst utilized in isomerization will be required.

The aforedescribed specific application of the invention contemplates the use of an absorber to reduce the concentration of light hydrocarbons in the circulating hydrogen stream and thereby reduce the size of this stream. Several advantages accrue from this, such as, for example lower compression costs and smaller processing equipment, conduits, etc. The amount of light hydrocarbons which must be removed from the hydrogen gas before it enters the isomerization reactor depends on a number of factors, which include the composition of the feed material being isomerized, the amount of cracking which takes place in the isomerization reaction, the temperature and pressure in accumulator 60, etc. Other things being equal in general the importance of the absorber 64 is dependent on the composition of the isomerization feed material. With feeds of low boiling point the absorber must remove a large amount of low boiling materials. On the other hand, when high boiling paraffins or other hydrocarbons are isomerized, the need for an absorber proportionally decreases.

As an alternative to the use of an absorber it may be desirable from the standpoint of economy to control the composition of the hydrogen-rich gas by continuously or periodically venting a portion of this stream to the atmosphere. When operating in this manner, the gases leaving accumulator 60 by-pass the absorber through conduit 63, with a portion being vented through conduit 65. Although this method of operation removes the necessity for an absorber, at least when using certain feed stocks, it has the disadvantage of increasing hydrogen consumption, since there is no way of recovering the hydrogen in the vented material for reuse. It is usually preferred to design the isomerization process to accommodate a wide variety of feed materials, both low and high boiling, therefore, the inclusion of an absorber is definitely advantageous.

It is not intended that the invention be restricted in scope by the specific application presented. Other types of catalysts, catalyst arrangements, flow schemes, etc., previously discussed or well known to those skilled in the art, are also contemplated for use with similar results. For example the process may be used for the isomerization of a mixture of normal paraffins, a single normal paraffin or a mixture of a normal paraffin and its isomer; also other hydrocarbons of the types previously described either alone or mixed with their isomers may also be isomerized. Depending upon the particular feed material used, slightly different flow schemes are required. For example, if a mixture of a normal paraffin and its isomer is to be processed, the feed normally bypasses tower 6 and enters tower 22 through conduit 18. If a single hydrocarbon is to be isomerized, the feed is usually introduced directly into exchanger 46. In both of the foregoing processes it is still necessary to provide a means for separating higher boiling compounds from the isomerization reactor effluent and also means for separating the isomer product and unconverted hydrocarbons.

A typical application of this invention on a commercial scale is illustrated by the following data.

*Example*

| Flows | | lb./hr. |
|---|---|---|
| Fresh Depentanizer Feed | °API | 77.0 | 87,700 |
| Absorber Feed | °API | 66.5 | 6,200 |
| Total Depentanizer Feed | °API | 81.1 | 126,000 |
| Deisopentanizer Feed | lb/gal | 5.19 | 63,400 |
| Debutanizer Feed | lb/gal | 5.23 | 39,200 |
| Reactor Feed | lb/gal | 5.23 | 33,000 |
| Hydrogen-rich gas to reactor | MW* | 7.9 | 4,400 |
| Isopentane Product | lb/gal | 5.15 | 30,400 |
| Debutanizer Net Overhead | MW* | 47.1 | 1,000 |
| Net Depentanizer Bottoms | °API | 66.5 | 56,400 |
| Hydrogen-rich gas to absorber | MW* | 11.4 | 6,400 |

*Molecular weight.

Temperatures:
  Depentanizer:                °F.
    Feed _____ 185
    Top _____ 136
    Bottom _____ 240
  Deisopentanizer:
    Top _____ 132
    Bottom _____ 166
  Absorber:
    Feed (liquid) _____ 100
    Feed (gas) _____ 100
    Top _____ 110
    Bottom _____ 105
  Debutanizer:
    Feed _____ 190
    Top _____ 145
    Bottom _____ 220
  Preheat furnace:
    In _____ 465
    Out _____ 780
  Reactor: Out _____ 780

Pressures:                     P. s. i. g.
  Depentanizer _____ 20
  Deisopentanizer _____ 30
  Absorber _____ 200
  Debutanizer _____ 80
  Reactor _____ 215

*Catalyst.*—Granular–0.6 weight percent platinum on alumina previously used as a reforming catalyst. Disposed in a vertical cylindrical reactor in a bed 8 feet in diameter x 25 feet in length. Weight space velocity 0.5% of oil/hour/pound of catalyst.

The following data is supplied to illustrate the advantageous results obtainable by the use of this process for butane, pentane and hexane isomerization.

The catalyst used in the butane, pentane and hexane isomerization tests was 0.6% platinum on alumina and had been regenerated a number of times. As a result it was partially deactivated as a reforming catalyst. Tabulated data was obtained from runs made in a 250 cc. isothermal test unit.

Butane isomerization [1]

| Run | 1 | 2 | 3 |
|---|---|---|---|
| Pressure, p. s. i. g. | 200 | 150 | 150 |
| Temperature, °F. | 750 | 900 | 925 |
| Space Velocity, lb./hr./lb. | 0.43 | 2.03 | 1.73 |
| $H_2$/Hydrocarbon, Mols/Mol. | 1.01 | 0.85 | 0.83 |
| Conversion, percent | 33.1 | 41.2 | 45.4 |
| Yields: | | | |
| $C_1$–$C_3$ | 2.4 | 11.0 | 14.6 |
| n-$C_4$ | 66.9 | 59.8 | 54.6 |
| i-$C_4$ | 6.8 | 25.4 | 28.3 |
| $C_4^=$ | 0.0 | 3.2 | 1.9 |
| n-$C_5$ | 12.5 | 0.6 | 0.6 |
| i-$C_5$ | 12.4 | 0.6 | 0.6 |
| Other $C_5$ | 1.0 | 0.6 | 0.6 |

[1] Feed composition: 99% N-butane and 1% iso-butane.

As indicated by the data in the above table rather high temperatures are necessary in order to obtain appreciable conversion of normal butane to isobutane. Increasing the reaction temperature also increases production of the $C_1$—$C_3$ fraction which amounts to approximately 15 percent of the feed at 925° F.

Pentane isomerization [1]

| Run | 1 | 2 | 3 | 4 | 5 | 6 | 7 | 8 | 9 | 10 | 11 |
|---|---|---|---|---|---|---|---|---|---|---|---|
| Pressure | 300 | 200 | 200 | 200 | 200 | 150 | 150 | 200 | 200 | 200 | 200 |
| Temperature, °F | 826 | 850 | 850 | 850 | 750 | 850 | 850 | 850 | 750 | 750 | 900 |
| Space Velocity, lb./hr./lb. | 3.97 | 3.56 | 3.53 | 3.85 | 0.90 | 3.91 | 3.81 | 1.00 | 0.90 | 0.45 | 0.99 |
| $H_2$/Hydrocarbon, Mols/Mol. | 0.89 | 0.35 | 0.74 | 3.20 | 2.91 | 0.93 | 0.79 | | 2.91 | 3.18 | 2.07 |
| Conversion, Percent | 44.9 | 54.2 | 48.6 | 31.3 | 16.8 | 51.5 | 59.2 | | 16.8 | 16.9 | 54.2 |
| Yields: | | | | | | | | | | | |
| $C_1$–$C_4$ | 1.0 | 3.4 | 3.3 | 1.6 | 3.1 | 3.0 | 5.2 | | 3.1 | 2.5 | 35.5 |
| n-$C_5$ | 54.7 | 45.5 | 51.1 | 68.3 | 44.5 | 48.2 | 40.5 | 51.5 | 44.5 | 44.3 | 24.0 |
| i-$C_5$ | 42.7 | 45.6 | 42.3 | 29.1 | 47.0 | 46.1 | 50.8 | 40.4 | 47.0 | 48.2 | 35.3 |
| Other $C_5$ | 1.3 | 3.6 | 1.8 | 0.7 | 1.6 | 1.6 | 2.2 | 2.0 | 1.6 | 1.6 | 3.1 |
| $C_6$ | 0.3 | 2.0 | 1.6 | 0.3 | 4.0 | 1.2 | 1.4 | 3.9 | 4.0 | 3.4 | 2.6 |

[1] Feed for runs 1 to 7 inclusive: 99.3% n-pentane, 0.5% isopentane and 0.2% cyclopentane. Feed for runs 8 to 11 inclusive: 52.9% normal pentane, 40.9% isopentane, 1.6% cyclopentane and 4.6% hexane.

A consideration of the data from the above table indicates that good conversions of normal pentane to isopentane can be obtained within the range of operating conditions comprising a temperature of about 750° F. to about 850° F., a pressure between about 150 and about 300 p. s. i. g., a space velocity between about 0.5 and about 4.0 pounds of hydrocarbon per hour per pound of catalyst and a hydrogen to hydrocarbon ratio between about 0.7 and about 3.3 mols per mol.

Temperature has a large effect on normal pentane conversion to isopentane, less effect on the production of hexane and pentane by-products and very little effect (below 850° F.) on the yield of $C_1$—$C_4$. In the process temperature range of about 800° F. to about 850° F. which appears most promising the side reactions are small provided that the normal pentane conversion is less than 60 weight percent.

Some evidence of catalyst deactivation for isomerization was noted during the experiments which provide the above data. The limits of operability of this process are difficult to adequately define, however, the combination of temperatures substantially higher than 800° F., hydrogen to hydrocarbon ratios less than 0.7 and low pressure (150 p. s. i. g.) produced a substantial (35%) loss in activity, which was restored by regeneration. Catalyst activity appears to be particularly sensitive to the hydrogen concentration, therefore, although conversion of the feed to isopentane is increased as the amount of hydrogen in the feed is decreased, operation below a hydrogen to hydrocarbon ratio of about 0.7 does not seem desirable.

Pressure in the range of 150 to 300 p. s. i. g. appears to have little or no effect on conversion.

The effect of thermodynamic equilibrium on the isomerization reaction as discussed previously is illustrated by run 11 which was made with a mixed feed containing a large percentage of isopentane. Although the data given does not indicate the approach the equilibrium it does show that at the high temperature employed in this run there is a consumption of iso-pentane either through conversion to $C_1$–$C_4$ or through conversion to normal pentane.

Hexane isomerization [1]

| | Run | |
|---|---|---|
| Pressure, p. s. i. g. | 150 | 150 |
| Temperature, °F. | 800 | 800 |
| Space Velocity, lb./hr./lb. | 4.1 | 2.1 |
| $H_2$/Hydrocarbon, Mols/Mol. | 0.68 | 0.75 |
| Conversion, Percent | 47.8 | 66.9 |
| Yields: | | |
| $C_1$–$C_4$ | 1.8 | 3.2 |
| n-$C_6$ | 52.5 | 33.0 |
| 2-Methylpentane | 24.1 | 33.8 |
| 3-Methylpentane | 18.7 | 25.7 |
| Naphthenes | 2.5 | 3.3 |
| Aromatics | 0.4 | 1.2 |

[1] Feed composition: 100% normal hexane.

The above two runs show that normal hexane is isomerized to give good yields of methylpentanes at a reaction temperature of 800° F. As would be expected, decreasing the space velocity substantially increases the production of methylpentane.

Having thus described the invention by reference to a specific application thereof, it is understood that no undue limitations or restrictions are to be imposed by reason thereof but that the scope of the invention is defined by the appended claims.

We claim:

1. A process for the isomerization of hydrocarbons which comprises contacting an isomerizable hydrocarbon in in a vapor state in the presence of hydrogen and a solid isomerization catalyst under suitable conversion conditions, separating the reaction zone effluent into a hydrogen rich gas, product isomer, unreacted hydrocarbon, low boiling hydrocarbon side products and high boiling hydrocarbon side products, contacting the hydrogen rich gas with a portion of the high boiling side products in an absorption zone to effect the removal of light hydrocarbons therefrom, passing hydrogen from the absorption zone to the reaction zone, combining the high boiling side product absorbent with the reaction zone effluent after hydrogen removal and recycling unreacted hydrocarbon to the reaction zone.

2. A catalytic isomerization process which comprises introducing a hydrocarbon mixture containing an isomerizable hydrocarbon into a first separation zone wherein a hydrocarbon oil rich in the isomerizable hydrocarbon is removed therefrom, effecting a further separation from the oil rich in isomerizable hydrocarbon of a stream rich in isomers of said hydrocarbon in a second separation zone, contacting the isomerizable hydrocarbon rich oil from the second separation zone in a reaction zone in the vapor state in the presence of hydrogen and a solid isomerization catalyst under suitable conversion conditions, passing the reaction zone effluent to a third separation zone wherein a gas rich in hydrogen is removed, passing the remainder of the reaction zone product to a fourth separation zone wherein low boiling reaction side products are removed, combining the heavy fraction from the fourth separation zone with the feed to the first separation zone, passing the remainder of the hydrocarbon mixture from the first separation zone to an absorption zone wherein it is contacted with the hydrogen rich gas to effect removal of light hydrocarbons therefrom, passing the hydrogen rich gas from the absorption zone to the reaction zone, and combining the enriched heavy fraction absorbent with the feed to the first separation zone.

3. A process for the isomerization of hydrocarbons which comprises contacting a normal paraffin hydrocarbon in a vapor state in the presence of hydrogen and a solid isomerization catalyst under suitable conversion conditions, separating the reaction zone effluent into a hydrogen rich gas, product isomer, unreacted hydrocarbon, low boiling hydrocarbon side products and high boiling hydrocarbon side products, contacting the hydrogen rich gas with a portion of the high boiling side products in an absorption zone to effect the removal of light hydrocarbons therefrom, passing hydrogen from the absorption zone to the reaction zone, combining the high boiling side product absorbent with the reaction zone effluent after hydrogen removal and recycling unreacted hydrocarbon to the reaction zone.

4. A process for the isomerization of hydrocarbons which comprises contacting an isomerizable hydrocarbon in a reaction zone in the vapor state in the presence of hydrogen and a solid isomerization catalyst under suitable conversion conditions, passing the reaction zone effluent to a first separation zone wherein a gas rich in hydrogen is removed, passing the remainder of the reaction product to a second separation zone wherein low boiling reaction side products are removed, passing the heavy fraction from the second separation zone to a third separation zone wherein high boiling reaction side products are removed from a light fraction, contacting the hydrogen rich gas with a portion of the high boiling side products in an absorption zone to effect removal of light hydrocarbons therefrom, passing the hydrogen from the absorption zone to the reaction zone, passing enriched high boiling side product absorbent with the reaction product to the second separation zone, passing the light fraction from the third separation zone comprising unreacted hydrocarbon and isomer product to a fourth separation zone wherein isomer product is removed and recycling unreacted hydrocarbon to the reaction zone.

5. A process for the isomerization of hydrocarbons which comprises contacting a normal paraffin hydrocarbon in a reaction zone in the vapor state in the presence of hydrogen and a solid isomerization catalyst under suitable conversion conditions, passing the reaction zone effluent to a first separation zone wherein a gas rich in hydrogen is removed, passing the remainder of the reaction product to a second separation zone wherein low boiling reaction side products are removed, passing the heavy fraction from the second separation zone to a third separation zone wherein high boiling reaction side products are removed from a light fraction, contacting the hydrogen rich gas to effect removal of light hydrocarbons therefrom with a portion of the high boiling side products in an absorption zone, passing the hydrogen from the absorption zone to the reaction zone, passing enriched high boiling side product absorbent with the reaction product to the second separation zone, passing the light fraction from the third separation zone comprising unreacted hydrocarbon and isomer product to a fourth separation zone wherein isomer product is removed and recycling unreacted hydrocarbon to the reaction zone.

6. A catalytic isomerization process which comprises introducing a hydrocarbon mixture containing a normal paraffin into a first separation zone wherein a hydrocarbon oil rich in the normal paraffin is removed from a higher boiling hydrocarbon fraction, effecting a further separation from the oil rich in the normal paraffin of a stream rich in isomers of said normal paraffin in a second separation zone, contacting the normal paraffin rich oil from the second separation zone in a reaction zone in the vapor state in the presence of hydrogen and a solid isomerization catalyst under suitable conversion conditions, passing the reaction zone effluent to a third separation zone wherein a gas rich in hydrogen is removed, passing the remainder of the reaction zone product to a fourth separation zone wherein low-boiling reaction side products are removed, combining the heavy fraction from the fourth separation zone with the hydrocarbon mixture introduced to the first separation zone, passing higher boiling hydrocarbon fraction separated in said first separation zone to an absorption zone to effect removal of light hydrocarbon from hydrogen rich gas separated from said third separation zone, passing hydrogen rich gas from the absorption zone to the reaction zone, and passing the high-boiling enriched absorbent fraction with the reaction product to the fourth separation zone.

References Cited in the file of this patent

UNITED STATES PATENTS

| | | |
|---|---|---|
| 2,275,178 | Hague | Mar. 3, 1942 |
| 2,319,500 | Grote | May 18, 1943 |
| 2,385,806 | Foster | Oct. 2, 1945 |
| 2,391,962 | Goldsby | Jan. 1, 1946 |
| 2,393,041 | Greensfelder | Jan. 15, 1946 |

U. S. DEPARTMENT OF COMMERCE
PATENT OFFICE

CERTIFICATE OF CORRECTION

Patent No. 2,834,823    James L. Patton et al.    May 13, 1958

It is hereby certified that error appears in the printed specification of the above numbered patent requiring correction and that the said Letters Patent should read as corrected below.

Column 4, line 39, for "pentance" read -- pentane --; line 51, for "isopentane is" read -- isopentane in --; column 6, line 70, for "20 standard" read -- 25 standard --; columns 9 and 10, in the table on Pentane Isomerization, column 1 thereof, under the heading "Run", line 1, for "Pressure" read -- Pressure, p.s.i.g. --; same table and same column, last line, for "$C_6$" read -- $C_6+$ --; column 9, line 74, for "the", second occurrence, read -- to --; column 10, line 47, strike out "in", second occurrence.

Signed and sealed this 1st day of July 1958.

(SEAL)
Attest:
KARL H. AXLINE
Attesting Officer

ROBERT C. WATSON
Commissioner of Patents